US009957002B2

(12) United States Patent
Klassen

(10) Patent No.: US 9,957,002 B2
(45) Date of Patent: May 1, 2018

(54) MOBILE PLATFORM

(71) Applicant: Genesis Robotics LLP, Langley (CA)

(72) Inventor: James Brent Klassen, Langley (CA)

(73) Assignee: Genesis Robotics LLP, Langley (CA)

( * ) Notice: Subject to any disclaimer, the term of this patent is extended or adjusted under 35 U.S.C. 154(b) by 54 days.

(21) Appl. No.: 15/012,664

(22) Filed: Feb. 1, 2016

(65) Prior Publication Data

US 2016/0251044 A1    Sep. 1, 2016

Related U.S. Application Data

(60) Provisional application No. 62/110,582, filed on Feb. 1, 2015.

(51) Int. Cl.
*B62D 57/02* (2006.01)
*B60F 5/00* (2006.01)
*B62D 57/028* (2006.01)

(52) U.S. Cl.
CPC .............. *B62D 57/022* (2013.01); *B60F 5/00* (2013.01); *B62D 57/028* (2013.01)

(58) Field of Classification Search
CPC ........ B62D 57/022; B62D 57/028; B60F 5/00
USPC .................... 180/7.1, 8.1, 8.2, 8.6
See application file for complete search history.

(56) References Cited

U.S. PATENT DOCUMENTS

| | | | | |
|---|---|---|---|---|
| 4,202,423 A * | 5/1980 | Soto | ........................ | B62D 57/00 180/8.6 |
| 5,515,934 A * | 5/1996 | Davis | ........................ | B25J 5/007 180/15 |
| 6,481,513 B2 * | 11/2002 | Buehler | .................. | B62D 63/02 180/8.6 |
| 6,922,610 B2 | 7/2005 | Okamoto et al. | | |
| 6,964,309 B2 | 11/2005 | Quinn et al. | | |
| 7,017,687 B1 * | 3/2006 | Jacobsen | .............. | B62D 57/028 180/8.3 |
| 7,380,618 B2 | 6/2008 | Gunderson et al. | | |
| 7,598,695 B2 | 10/2009 | Takanishi et al. | | |

(Continued)

FOREIGN PATENT DOCUMENTS

| | | |
|---|---|---|
| CN | 203332259 U | 12/2013 |
| EP | 1 990 137 B1 | 12/2010 |

(Continued)

OTHER PUBLICATIONS

Botelho, W.T. et al, "Software and Hardware Control of a Hybrid Robot for Switching between Leg-type and Wheel-type Modes," Sba Controle & Automacao, vol. 22 No. 1, Campinas, Feb. 2011, pp. 1-19.

(Continued)

*Primary Examiner* — Tony H Winner
(74) *Attorney, Agent, or Firm* — Seed IP Law Group LLP

(57) ABSTRACT

A mobile platform intended for civilian, industrial, research or other use. An ambulation system or mobile platform such as for traveling over uneven terrain includes one or more leg arrangements attached to a main body or chassis. In an embodiment, a leg arrangement comprises one or more legs, such as legs that rotate in the same and singular direction around their respective rotary joints when the vehicle is moving in a single direction. The rotational axis for both legs is located near each other and preferably coaxially and allows ground contact of two or more legs at all times.

24 Claims, 10 Drawing Sheets

(56) References Cited

U.S. PATENT DOCUMENTS

| | | |
|---|---|---|
| 8,914,151 B2 | 12/2014 | Hurst et al. |
| 8,989,922 B2 | 3/2015 | Jones et al. |
| 2005/0133280 A1* | 6/2005 | Horchler ............. B62D 57/022 180/8.1 |
| 2014/0238755 A1* | 8/2014 | Chou .................. B62D 57/022 180/7.1 |
| 2014/0239604 A1 | 8/2014 | Lecompte |

FOREIGN PATENT DOCUMENTS

| | | |
|---|---|---|
| EP | 2 055 445 B1 | 3/2011 |
| EP | 1 842 628 B1 | 5/2011 |

OTHER PUBLICATIONS

Lin, P-C., "Developing a Leg-Wheel Transformable Robot Using LabVIEW and CompactRIO," downloaded from www.ni.com, Jan. 2016, pp. 1-5.
Arvind Menon's Webpage, "Evolution of Alien's Manipulator," Article downloaded from www.menet.umn.edu Jan. 2016, pp. 1-12.
Robotics Unlimited "OutRunner is world's first remotely controlled running robot," KurzweilAI, Accelerating Intelligence. Videos, http://www.kurzweilai.net/outrunner-the-worlds-first-rc-running-robot, May 27, 2014, includes a video also available on youtube.com.
Image of Outrunner dated May 27, 2014.
International Search Report and Written Opinion for International Application No. PCT/CA2016/050084 dated May 20, 2016.

\* cited by examiner

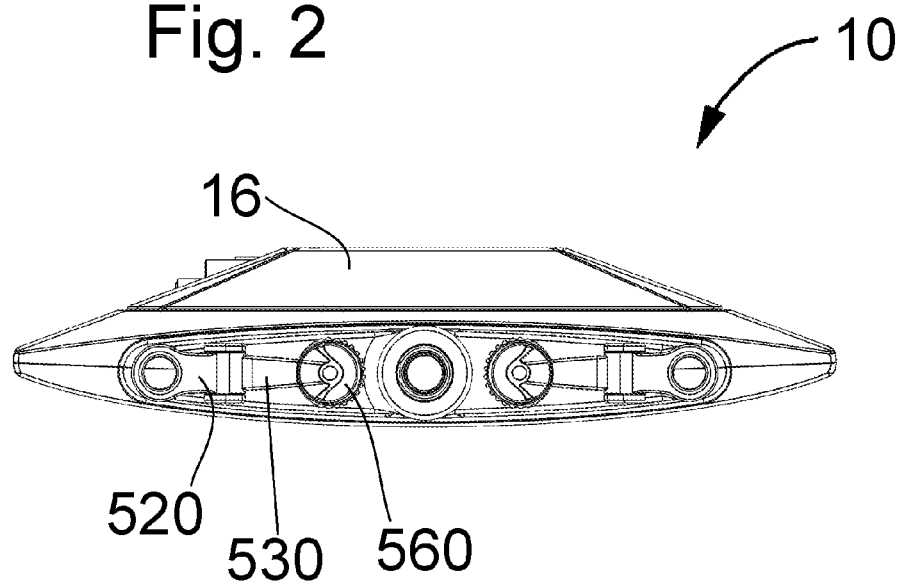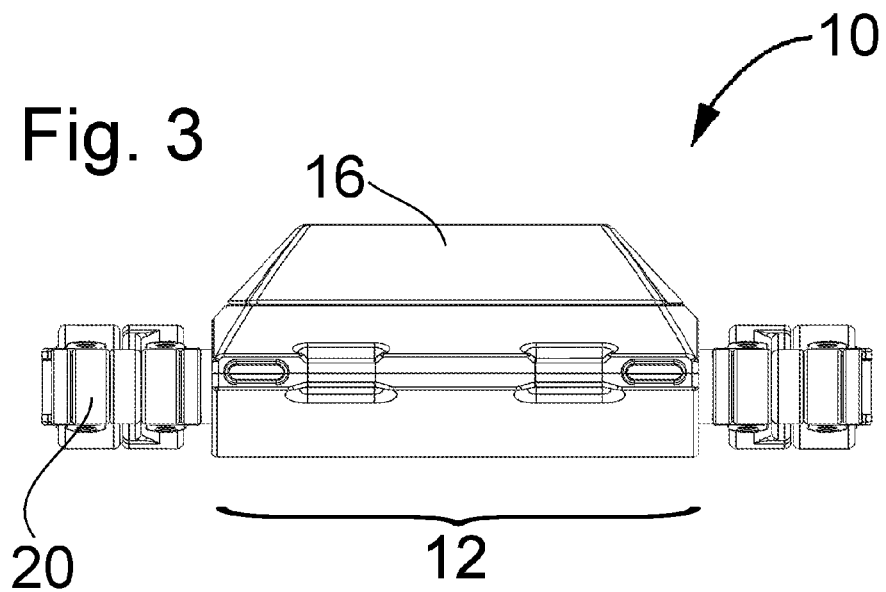

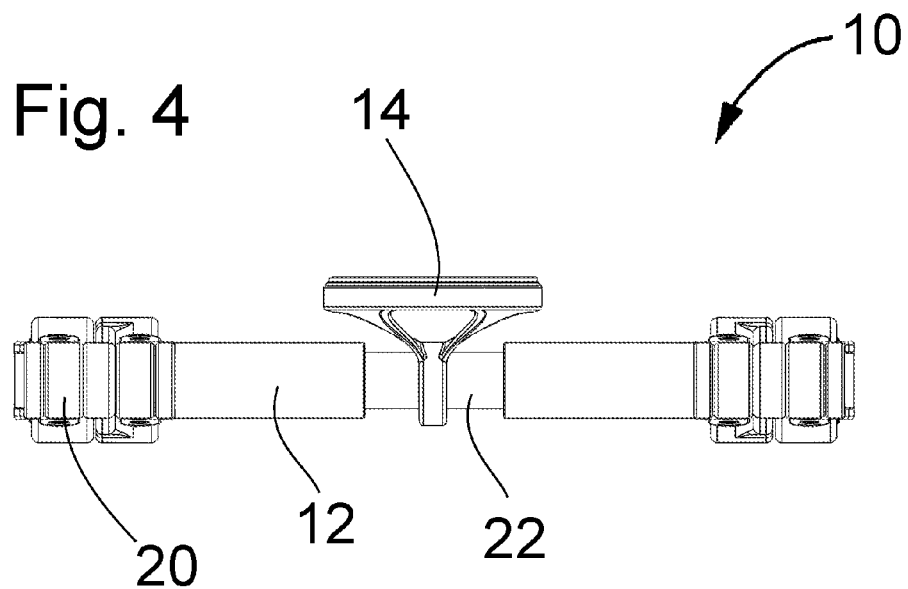
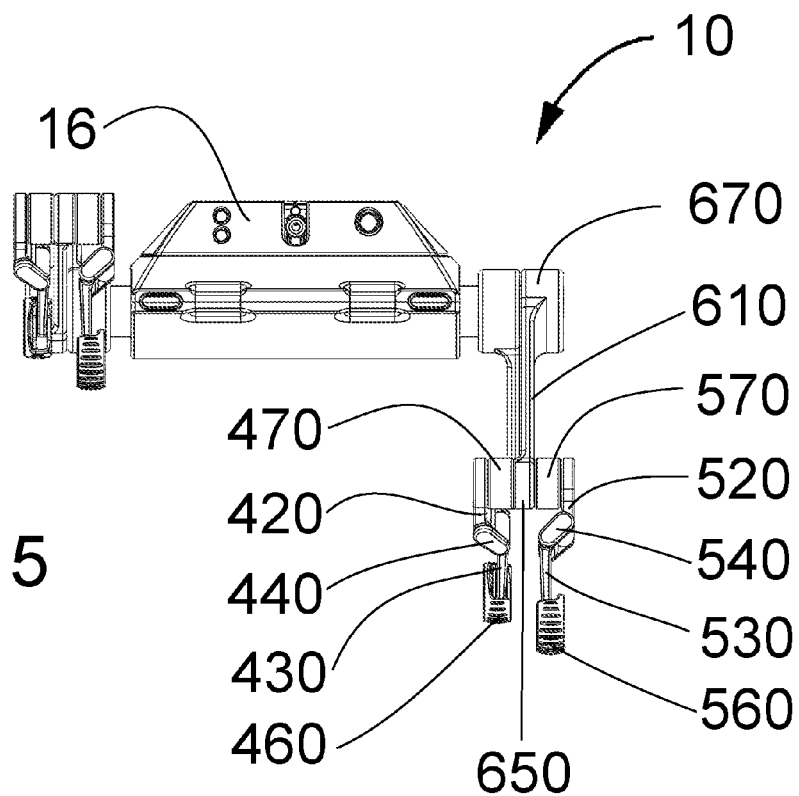

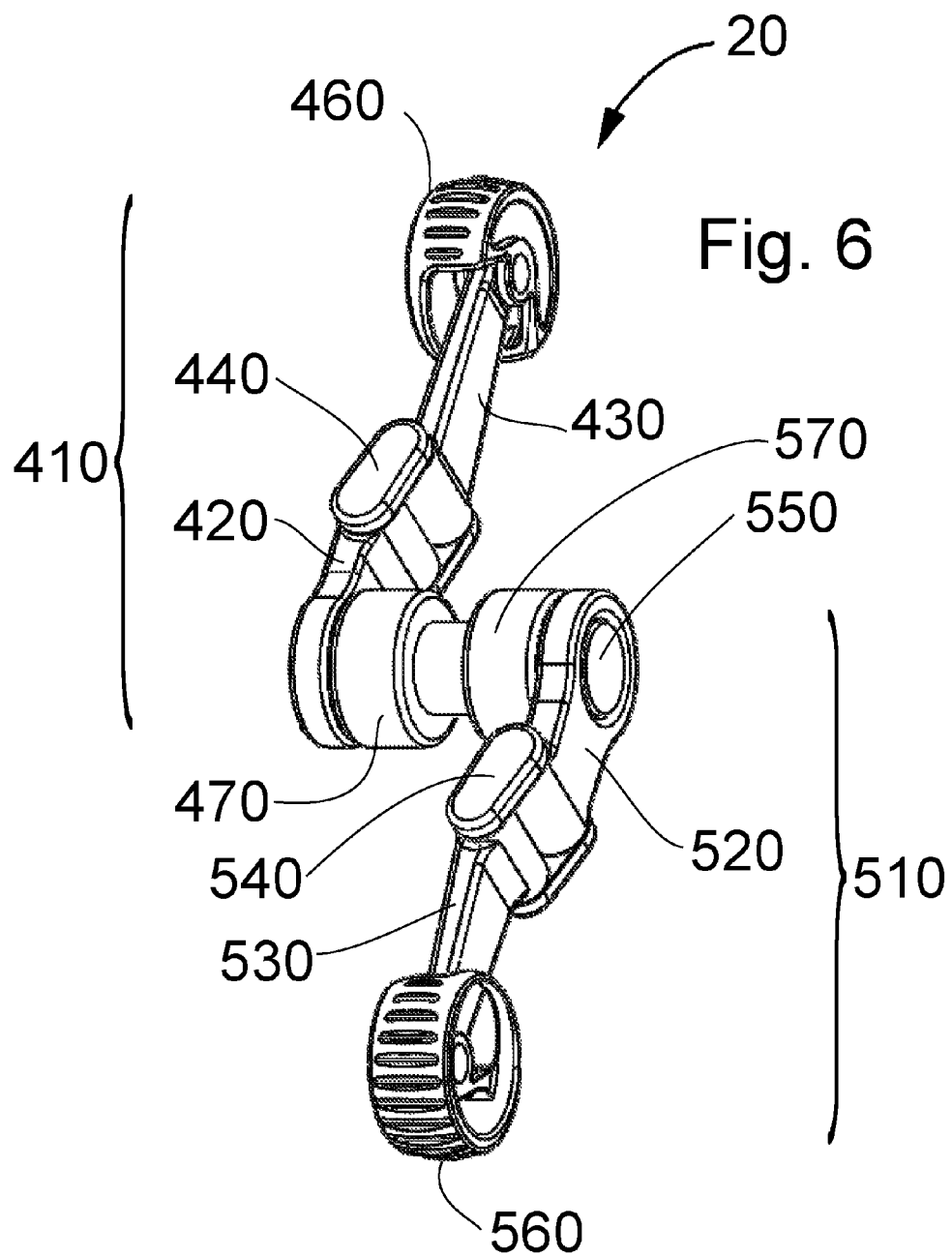

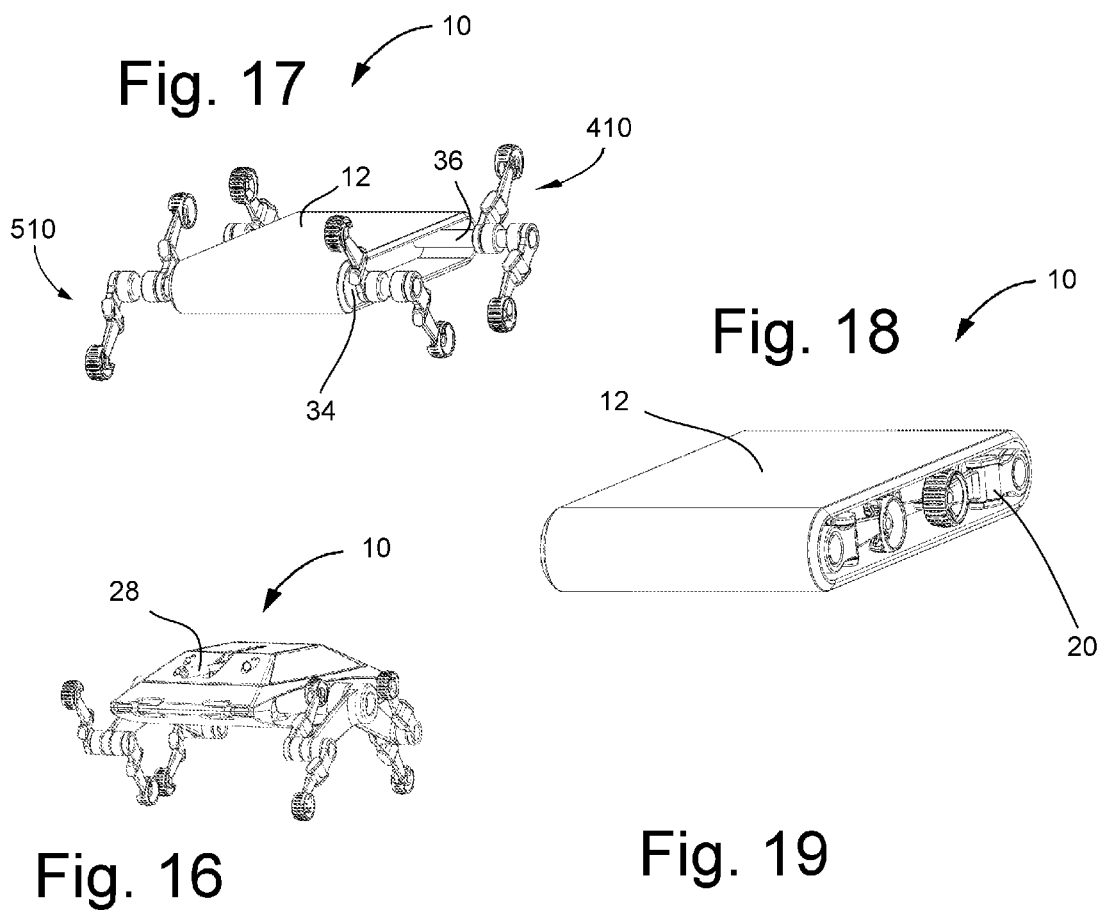
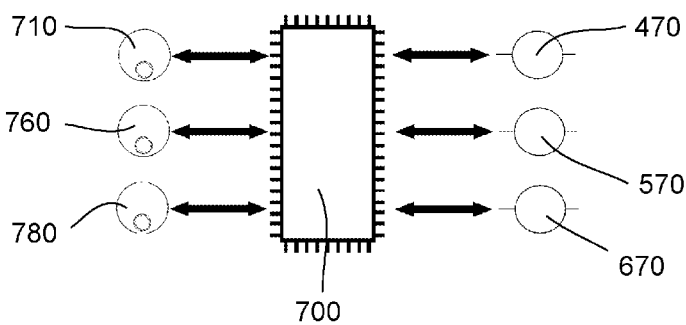

Fig. 20
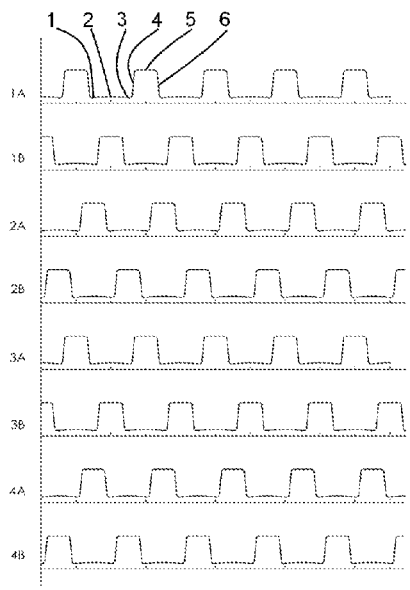
Fig. 21
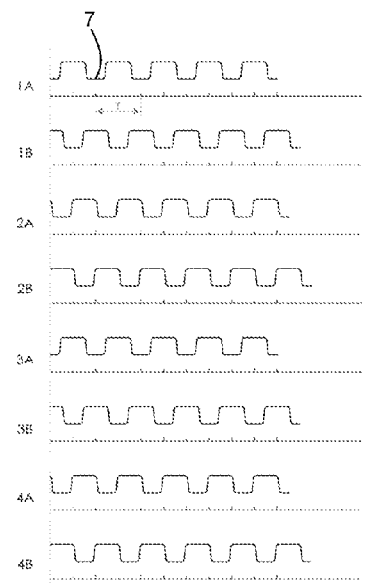
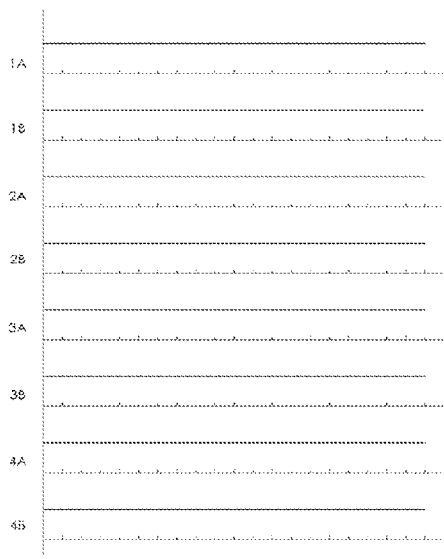
Fig. 22
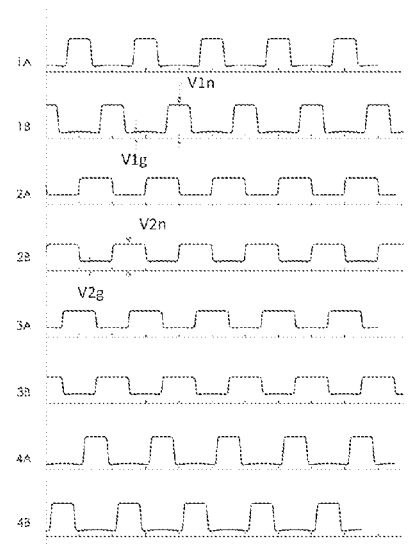
Fig. 23

Fig. 24
Fig. 25
Fig. 26
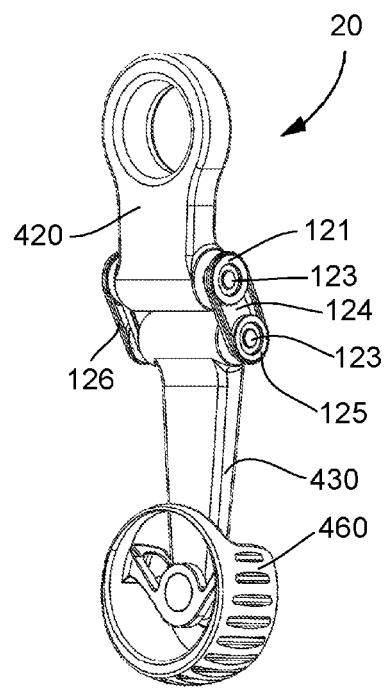
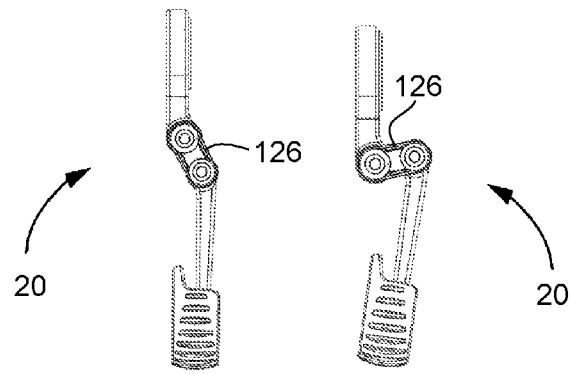
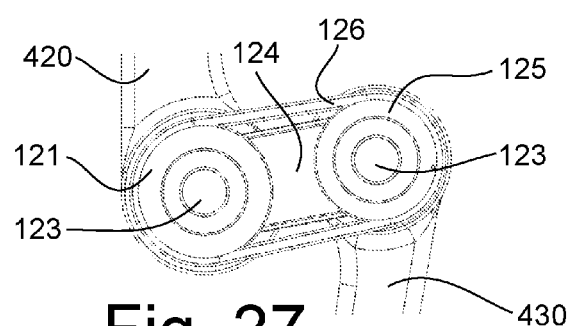
Fig. 27
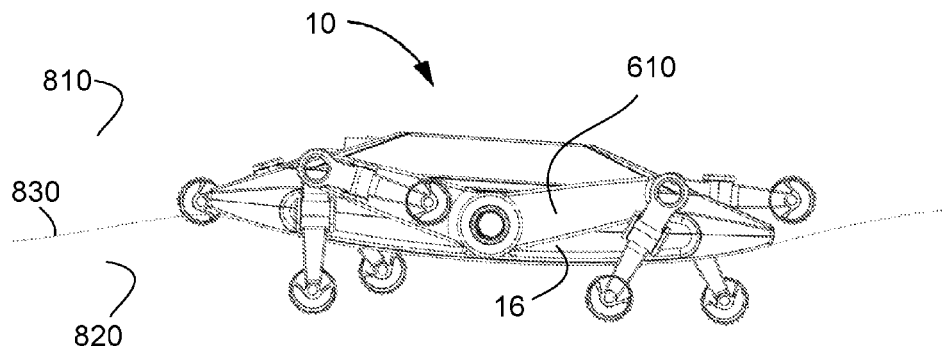
Fig. 28

MOBILE PLATFORM

TECHNICAL FIELD

Robotic vehicles and mobile platforms.

BACKGROUND

Robotic vehicles have been made with a variety of supporting structures, including legs. Legs are useful where the ground surface is uneven. There are known robotic vehicles with legs that rotate in a circle in one direction with compressible legs to cause the ride to be more even. One such robotic vehicle is the Outrunner. Another robotic vehicle from National Taiwan University has wheels that can split into separate legs, each leg being somewhat compressible when supporting the vehicle on the ground. U.S. Pre-Grant Publication No. 2014/0239604 discloses a robot with rotating legs. There is disclosed a new robotic vehicle.

SUMMARY

In an embodiment, there is disclosed a mobile platform having a main body with a first side and a second side which together define a lateral direction with respect to the main body, and one or more leg arrangements. Each leg arrangement may comprise a first leg mounted for 360 degree rotation in a first plane on the main body at a first rotary joint on the first side of the mobile platform, the first leg connected to be driven by a first actuator controlled by a processor and the first rotary joint having a first rotation axis, a second leg mounted for 360 degree rotation in a second plane on the main body at the first rotary joint, the second leg connected to be driven by a second actuator controlled by the processor; and the processor being configured to instruct the first actuator to rotate the first leg and the second actuator to rotate the second leg.

In a further embodiment, there is disclosed a mobile platform, comprising a main body having a first side and a second side which together define a lateral direction with respect to the main body; a first leg mounted for 360 degree rotation in a first plane on the main body at a first rotary joint on the first side of the mobile platform, the first leg connected to be driven by a first actuator controlled by a processor and the first rotary joint having a first rotation axis; a second leg mounted for 360 degree rotation in a second plane on the main body at a second rotary joint on the main body, the second leg connected to be driven by a second actuator controlled by the processor and the second rotary joint having a second rotation axis; the processor being configured to instruct the first actuator and the second actuator to follow stored leg rotation algorithms where the leg rotation speed is non-uniform.

In a further embodiment, there is disclosed a mobile platform, comprising a main body having a first side and a second side which together define a lateral direction with respect to the main body, a first leg mounted for 360 degree rotation in a first plane on the main body at a first rotary joint on the first side of the mobile platform, the first leg connected to be driven by a first actuator controlled by a processor and the first rotary joint having a first rotation axis; a second leg mounted for 360 degree rotation in a second plane on the main body at a second rotary joint on the main body, the second leg connected to be driven by a second actuator controlled by the processor and the second rotary joint having a second rotation axis; the processor being configured to instruct the first actuator to rotate the first leg at higher speed when the first leg is not in contact with the ground surface than when the first leg is in contact with the ground surface; and the processor being configured to instruct the second actuator to rotate the second leg at higher speed when the second leg is not in contact with the ground surface than when the second leg is in contact with the ground surface.

In a further embodiment, there is disclosed a mobile platform, comprising a main body having a first side and a second side which together define a lateral direction with respect to the main body; a first leg mounted for 360 degree rotation in a first plane on the main body at a first rotary joint on the first side of the mobile platform, the first leg connected to be driven by a first actuator controlled by a processor and the first rotary joint having a first rotation axis; a second leg mounted for 360 degree rotation in a second plane on the main body at a second rotary joint on the first side of the mobile platform, the second leg connected to be driven by a second actuator controlled by the processor and the second rotary joint having a second rotation axis; the first leg is more flexible in the lateral direction than in the first plane and the second leg is more flexible in the lateral direction than in the second plane; and the processor is configured to instruct the first leg and second leg at different rotational speeds to effect a turning movement when required.

In various embodiments, there may be included any one or more of the following features: the second rotary joint is located on the first side of the main body, axially displaced from the first actuator; a sensor arrangement for determining when the first leg is in contact with a ground surface and when the second leg is in contact with the ground surface and the processor is responsive to the sensor arrangement to control the first actuator and the second actuator; the processor is configured to instruct the first actuator and the second actuator to follow stored leg rotation algorithms; each of the first leg and the second leg are variable in length and exert an increased extension force as the respective first leg and the second leg are compressed allowing a terminal point on each of the first leg and the second leg to travel in a generally circular path for greater than 180 degrees, and a generally straight and horizontal path for less than 180 degrees as a result of ground contact forces shortening the leg length progressively toward a vertical leg angle; the first leg is more flexible in the lateral direction than in the first plane and the second leg is more flexible in the lateral direction than in the second plane; the processor is configured to rotate the first leg and the second leg so that at least one of the first leg and the other leg is in contact with the ground at all times; the processor is configured to rotate the first leg and the second leg so that the rotational speed of each of the first leg and the second leg is lower at an initial and a final ground contact positions and higher at a vertical leg position to maintain a generally constant horizontal speed of the respective first rotary joint and second rotary joint; in each of the first leg and the second leg, two or more feet are rotational attached to a generally vertically movable suspension member; and the first leg and the second leg are mounted co-axially.

In various further embodiments, there may be included any one or more of the following features: a third leg mounted for 360 degree rotation in a third plane on the main body at a third rotary joint on the second side of the mobile platform, the third leg connected to be driven by a third actuator controlled by the processor and the third rotary joint having a third rotation axis; a fourth leg mounted for 360 degree rotation in a fourth plane on the main body at a fourth rotary joint on the second side of the mobile platform, the fourth leg connected to be driven by a fourth actuator controlled by the processor and the fourth rotary joint having a fourth rotation axis; the processor being configured to instruct the third actuator to rotate the third leg at higher speed for more than 180 degrees of rotation when the third leg is generally expected to not be in contact with the ground surface and when the third leg is generally expected to be in contact with the ground surface; and the processor being configured to instruct the fourth actuator to rotate the fourth leg at higher speed when the fourth leg is expected to be generally not in contact with the ground surface and when the fourth leg is expected to be generally in contact with the ground surface.

In various further embodiments, there may be included: the sensor arrangement is arranged to determine when the third leg is in contact with a ground surface and when the fourth leg is in contact with the ground surface; the third leg and the fourth leg are mounted co-axially; and the second rotary joint is located on the second side of the main body as the first rotary joint.

There may be included in any of the embodiments, any one of more of the following: a swing arm mounted on the main body, the leg arrangement(s) being mounted on the swing arm; the swing arm is mounted on the main body via a spar extending from the main body; there are two or more leg arrangements, each leg arrangement being mounted on a respective swing arm mounted on the main body; there are at least four leg arrangements, each of the leg arrangements being mounted on a swing arm, and the swing arms are mounted in pairs on opposed sides of the main body; in each leg arrangement, each of the first leg and the second leg are variable in length and exert an increased extension force as the respective first leg and the second leg are compressed allowing a terminal point on each of the first leg and the second leg to travel in a generally circular path for greater than 180 degrees, and a generally straight and horizontal path for less than 180 degrees as a result of ground contact forces shortening the leg length progressively toward a vertical leg angle; and in each leg arrangement, the first leg is more flexible in the lateral direction than in the first plane and the second leg is more flexible in the lateral direction than in the second plane.

The processor may be configured to cause, in various embodiments, the first leg and the second leg to rotate at the same average ground speed; the mobile platform includes legs, which include the first leg and the second leg, on a diagonal across the mobile platform center of gravity and the legs across the diagonal rotate in phase; when the mobile platform is traveling in a straight line, legs on a front corner of the mobile platform rotate to achieve the same average ground speed as legs on the opposite side of the vehicle at the front of the vehicle, with legs on the opposite side out of phase with legs on the first side by an average of 360 degrees divided by twice the number of legs on a corner; the legs on the mobile platform so that legs on a corner rotate at higher ground contact speed to change vehicle direction than legs on the opposite side of the vehicle, while staying, on average, in phase with legs at a diagonal corner; legs on a front corner rotate at higher ground contact speed to change vehicle direction than legs at the front and on the opposite side of the vehicle, while staying, on average, out of phase by an average of 360 degrees divided by twice the number of legs on a corner; two or more legs on a corner rotate at the same speed in high speed mode.

There are also provided methods of operating a mobile platform wherein the method steps correspond to instructions provided by the processor or the legs carrying out the leg rotation modes mentioned in this summary and the detailed disclosure.

BRIEF DESCRIPTION OF THE FIGURES

Embodiments will now be described with reference to the figures, in which like reference characters denote like elements, by way of example, and in which:

FIG. 2 is a lateral view of the vehicle with retracted arm and leg assemblies.

FIG. 3 is a posterior view of the vehicle with retracted arm and leg assemblies.

FIG. 4 is a posterior view of the vehicle with retracted arm and leg assemblies, with the payload shell removed to reveal the interior chassis including an exemplary payload platform.

FIG. 5 is an anterior view of the vehicle with a first set of arm and leg assemblies medially contracted and second set of arm and leg assemblies distally extended; the posterior arm and leg assemblies fully obscured by the anterior arm and leg assemblies.

FIG. 6 is an isometric projection fragmentary illustration of a leg arrangement.

FIG. 16 is an isometric projection illustrating the exemplary robotic vehicle as a weapons platform.

FIG. 17 is an isometric projection illustrating an alternate exemplary robotic vehicle and mobile platform with a chassis comprising an anterior and poster spar with each spar directly connected to leg arrangement.

FIG. 18 is an isometric projection illustrating the alternate exemplary vehicle with retracted leg arrangements.

FIG. 19 is an electric schematic showing sensors, processor, actuators.

FIG. 20 is a leg rotation graph showing a low speed mode of operation of an exemplary mobile platform.

FIG. 21 is a leg rotation graph showing a transition speed mode of operation of an exemplary mobile platform.

FIG. 22 is a leg rotation graph showing a high speed mode of operation of an exemplary mobile platform.

FIG. 23 is a leg rotation graph showing a turning mode of operation of an exemplary mobile platform.

FIGS. 24-27 show details of an exemplary leg extension arrangement.

FIG. 28 shows a mobile platform illustrating an amphibious position.

Figure 1:
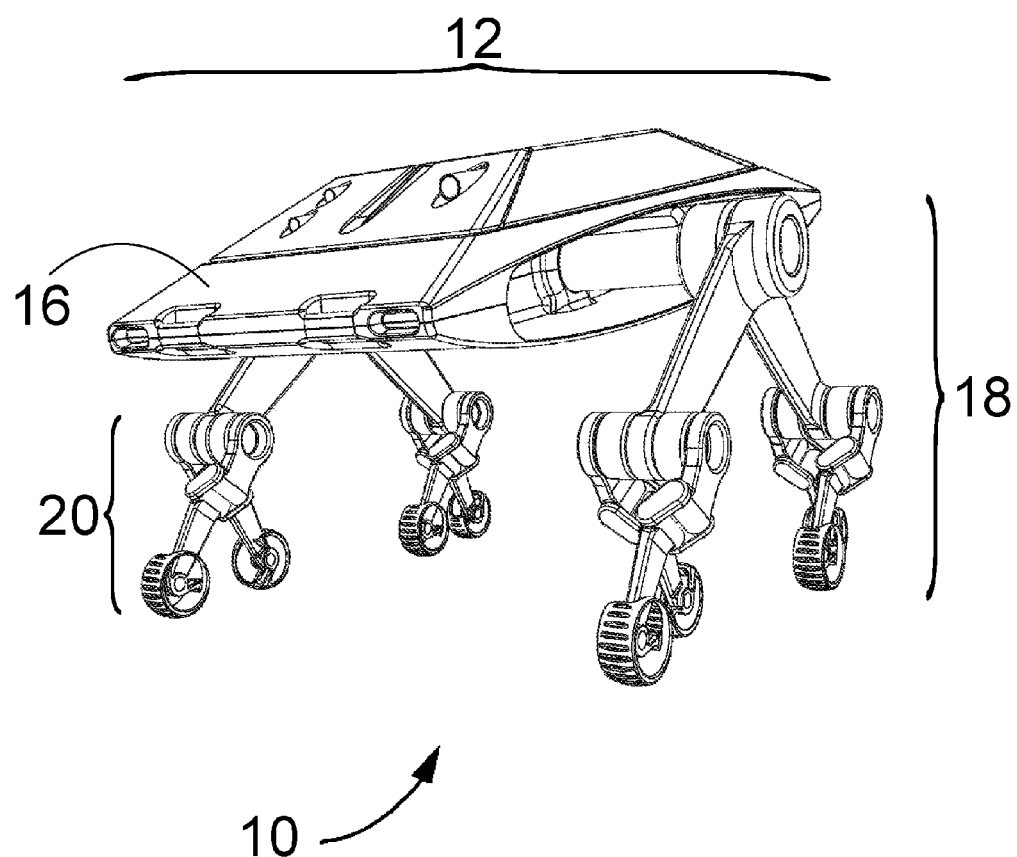
FIG. 1 is an isometric projection illustrating an exemplary robotic vehicle and mobile platform with a chassis including a single central spar and a payload shell.

The following elements are identified in the figures:
robotic vehicle and mobile platform 10
chassis 12
payload platform 14
payload shell 16
arm and leg assembly 18
leg arrangement 20
central spar 22
payload 28 laterally extendable anterior spar 34
laterally extendable posterior spar 36
upper pulley 121
shaft 123
rotating link 124
lower pulley 125
link means 126
inner leg 410
inner upper leg member 420
inner lower leg member 430
inner bar linkage (spring element) 440
inner rotary joint 450
inner foot 460
back left inner foot 464
back right outer foot 468
inner actuator 470
outer leg 510
outer upper leg member 520
outer lower leg member 530
outer bar linkage (spring element) 540
outer rotary joint 550
outer foot 560
front left outer foot 562
back left outer foot 568
outer actuator 570
suspension member (swing arm) 610
arm rotary joint 650
swing arm actuator 670
processor 700
leg sensor 710
swing arm sensor 760
angle sensor 780
air 810
water 820
water surface 830

DETAILED DESCRIPTION

Immaterial modifications may be made to the embodiments described here without departing from what is covered by the claims.

A robotic vehicle with passive suspensions elements is disclosed that is a mobile platform intended for civilian, industrial, research, and other uses. A vehicle that is an ambulation system or mobile platform 10 such as for traveling over uneven terrain (not shown) includes one or more leg arrangements 20 attached to a main body or chassis 12.

As illustrated in FIG. 1, an embodiment of the vehicle 10 comprises four arm and leg assemblies 18 attached to a central spar 22 housed in a payload shell 16. As illustrated in FIG. 4, the embodiment of the vehicle further comprises a payload platform 14 on the chassis 12 within the payload shell 16.

As illustrated in FIG. 6, in an embodiment, a leg arrangement 14 comprises one or more legs, such as legs 410, 510 that rotate in the same and singular direction around their respective rotary joints 450, 550 when the vehicle 10 is moving in a single direction. The rotational axis for both legs 410, 510 is located near each other and preferably coaxially.

The legs 410, 510 may be variable in length and exert an increased extension force as they are compressed allowing a point on a foot 460, 560 (or terminus of the leg 410, 510 respectively) to travel in a generally circular path (when viewed along the rotational axis) for greater than 180°, and a generally straight and horizontal path for less than 180° as a result of ground contact forces shortening the leg length progressively toward a vertical leg angle (vertical, here, referring to perpendicular to the average terrain surface). A foot 460, 560 may have a small amount of rotation to provide some ground contact compliance.

The leg extension force increase may be tuned to match the component of the ground contact force which is aligned with the leg suspension. For clarity, when the foot 460, 560 of a leg 410, 510 moves through a ground contact phase, the leg 410, 510 will be the longest and at the greatest angle from vertical at the beginning and end of its ground contact motion. At these positions, the leg extension force will be the lowest because the angle of the leg 410, 510 to the ground allows a lower extension force to support the weight of the vehicle. When the leg 410, 510 is perpendicular to the ground, the leg 410, 510 will be the shortest and the extension force will be the greatest to support the weight of the vehicle at the same ride height at this position. The extending force may be provided by a passive or active or semi-active or semi passive force with or without a damper. The legs 410, 510 may be more flexible in the lateral direction than in the fore/aft direction (in the plane of rotation).

The rotational speed of a leg 410, 510 is controlled by a main CPU or processor 700 that instructs leg actuators 470, 570, to rotate the respective leg 410, 510 and may be slower when its respective foot 460, 560 is contacting the ground and faster when its respective foot is not contacting the ground. The higher of the two speeds may be controlled by the processor to be adequate to initiate ground contact of one foot before the other foot loses ground contact. Thus, in an embodiment, at least one of the two feet is always in contact with the ground.

The processor 700 may also control the actuators 470, 570, so that the rotational speed of the legs is lower at the initial and final ground contact positions and higher at the vertical leg position to maintain a generally constant horizontal speed of the leg rotary joint. While it is possible that the rotary joints 450, 550 may be separate items from the actuators 470, 570, all of the actuators and rotary joints used in the vehicle 10 may include the rotary joints. In particular, all of the actuators 470, 570, including a swing arm actuator 670, may be formed by any of a variety of hydraulic or electric motors, including those designed for wheel motors. The textbook by Chau, K. T. (May 26, 2015). Electric Vehicle Machines and Drives: Design, Analysis and Application, contains many such examples. The designer may choose a suitable motor depending on the size and performance requirements of the vehicle 10.

Leg extension may be provided by a four bar linkage (spring element) 440, 540 or telescoping cylinder (not shown). More than two legs 410, 510 may rotate around a similar axis. The feet may be rotational attached to a generally vertically movable suspension member, which may be a swing arm 610 that pivots at an arm rotary joint 650 used to support the mass of the vehicle actively and/or passively. Torque on the joint 650 may be held generally constant through a portion of the vertical movement. Two or more sets of coaxial or nearly coaxial legs 410, 510 may be used to support the weight of the vehicle at different locations on the vehicle. Two or more sets of coaxial or nearly coaxial legs 410, 510 may be attached to two or more generally vertically movable suspension members 610. The leg extension suspension may be passive, active, or semi-active or semi-passive. The swing arm suspension may be passive, active, semi-active or semi-passive.

In an exemplary embodiment described here and shown in the drawings, the vehicle 10 may use a combination of active control and suspension linkage technology to achieve stable ambulation over uneven terrain. The suspension may use a combination of rotary actuators 470, 570 and spring elements 440, 540 to reduce the vertical force variations on the vehicle 10 with a simple rotary motion of the ground contacting members. The result is a highly controllable platform with the following characteristics in various embodiments: high angle adjustment of pitch, roll and yaw; very low vertical energy transfer to chassis during vertical movement of ground contacting members if desired, such as, but not limited to, during high frequency vertical movements; ability to move each of the four swing arms (or more) independently to navigate relatively large obstacles and to maintain its stability even when the chassis 12 has been tilted to a 45° angle, or greater in some embodiments, from its ordinary horizontal plane; ride height is highly controllable to allow obstacle negotiation such as ambulating under or over objects.

The vehicle can be used for mobile platforms (FIG. 16) that supports a payload of any type 28 including, but not limited to the following which are not illustrated: transportation of people and equipment, transportation of power generation and or fuel to charge and/or support other systems, such as but not limited to other vehicles of the same types.

The system can be manufactured in a range of sizes which include micro machines all the way up to multi-tonne machines such as but not limited to earth moving, transportation of supplies or equipment, or personnel transport.

Different strategies for powering this device may be used including, but not limited to, a solar charging configuration with solar cells on the top of the mobile platform, combustion engines with onboard fuel source, and electric motors with on board battery or other power generation or energy storage system.

An optional feature of the present device are one or more laterally extendable central spars, this is illustrated in FIG. 17 with an anterior spar 24 and a posterior spar 26.

This spar can be non-coaxial with the opposing spar and/or separate spars can be used for each swing arm. This optional laterally extensible function, along with the ability to align the legs 410, 510 with the swing arms 610, allows the device to achieve a very compact stowed size and shape. Shown here is a configuration with four swing-arms 610, but any number of swing-arms is conceivable and anticipated including one swing arm 610 or two swing arms 610 or three swing-arms 610 or more. The rotary joints 540 are preferably constructed to allow lateral compliance of the lower leg to allow "differential speed steering" also known as skid steering with reduced skidding.

As illustrated in FIG. 18, the leg arrangements 20 attached to the extensible spars 34, 36 may be configured to permit the leg arrangements 20 to be retracted into the chassis 12. Similarly, the arm and leg assemblies 18 of the preferred embodiment may also be attached to extensible spars (shown retracted in FIG. 18) that may be configured to permit the assemblies 18 to be retracted into the chassis 12. Retraction of these or the central spars can be done with any means, including, but not limited to, hydraulics, balls screws, or linear motors.

The foot member 460, 560 may be virtually any shape but is shown in the drawings with a round curved surface. This member 460, 560 is preferably flexibly secured to the lower leg member 430, 530, of the leg 20, 30. The lower leg member 430, 530 is attached to the upper leg member 420, 520 via a four bar linkage 440, 540 or another system that allows for extensible movement of the upper 420, 520 and lower 430, 530 relative to each-other. This extensible joint 440, 540 (which could also use telescoping cylinder or other system instead of the four bar linkage) is preferably fitted with a spring and damper common to vehicle suspension systems such as but not limited to a coil spring or gas spring, or rotary spring.

To achieve ambulation with minimal vertical force variation on the swing-arm 610, the leg assemblies 410, 510 rotate such that the initial contact of the foot 460, 560 with the ground happens when the leg assembly 410, 510 is at an angle other than perpendicular to the terrain (ahead of the leg attachment to the swing arm 610, when moving forward). At this position the vertical force acting on the foot 460, 560 will not be fully transferred along the linear axis of the leg. This corresponds with the reduced spring force of the four bar linkage 440, 540 in this extended position. As the leg 410, 510 continues to rotate towards a perpendicular angle (generally vertical on a horizontal surface) the force acting on the spring 440, 540 will increase due to the vertical alignment of the ground contact force direction along the length of the vertical leg. With correct tuning of the spring rate, the vertical force variation on the swing arm 610 can be minimized. The effect of the rotating leg assembly 410, 510 is shown in the drawings, where the vertical ground contact force has greater effect on the suspension spring as the leg assembly 410, 510 becomes more perpendicular to the ground and more aligned with the ground contact force direction. This shortens the leg 410, 510 via articulation/compression of the four bar linkage suspension 440, 540 progressively toward vertical leg alignment to achieve a generally horizontal portion of the ground contact portion of the foot rotation path (relative to the rotary attachment axis of the leg to the swing arm 610).

One of the benefits of the disclosed ambulation linkage is the ability to achieve a walking interaction with the terrain with uni-directional leg rotation. Advantages of unidirectional leg rotation include reduced acceleration of the rotary actuator at the leg attachment to the swing arm 610 as compared to if the leg was required to stop at the end of each ground contact and swing forward. To create this clearance between the foot 460, 560 and the ground, if the foot 460, 560 were to swing forward, the foot 460, 560 would need to lift off the ground for clearance. By continuing the leg/foot rotation in the same direction, ground clearance is not an issue and when the foot rotates to the forward position because it is high enough above the ground to step up or over obstacles that are near or above the height of the leg rotary actuator 470, 570.

A single leg 20 per swing arm 40 can be used if other ground contact points are maintaining the vehicle ride height and stability. A preferred configuration is shown in the drawings which uses two legs 410, 510 (though more than two legs per swing arm may be used) assemblies rotating around the same or similar axis. By rotating each leg 410, 510 at a high enough speed when it is not in contact with the ground, (relative to the speed of the other leg 410, 510 on that swing arm 610 when the other leg is in contact with the ground) it is possible for each leg 410, 510 to rotate from its last ground contact angle (behind the rotary actuator), to its initial ground contact angle (ahead of the rotary actuator) before the other leg 410, 510 leaves the ground.

In an example, each leg 410, 510 rotates with its respective foot 460, 560, preferably contacting the ground through an angle of 70° at a speed of 10 rpm, and through most of the remaining 290° at a speed of greater than 50 rpm. The other leg rotates with a similar speed/angle cycle. Both legs 410, 510 may have an additional constraint whereby each leg is only allowed to leave the ground (after ground contact in this example) and rotate at high speed, if the other leg in that pair has contacted the ground (in front of the actuator in this example). In this way, an uninterrupted vertical support of the vehicle via the swing arm can be accomplished.

A schematic of the wheel path of a single leg arrangement 410, 510 is shown in the drawings, particularly in FIGS. 7-12 and FIGS. 13-15. All eight legs 410, 510 of all four leg arrangements 20 in this exemplary embodiment use a similar suspension system to maintain a reasonably consistent vertical force on all four swing arms 610 when walking over flat terrain.

It is preferable in some applications, for positional and/or angular sensors 710, 780 in each leg 410, 510 and/or foot 460, 560 to sense when each foot contacts the ground at the beginning of a ground contact phase. The sensors 710, 780 may be located at any suitable location in the legs 410, 510 or feet 460, 560. A leg 410, 510 in a leg arrangement 20 continues to rotate at the ground contact speed until the first foot 460, 560 contacts the ground. For this sequence to provide a minimum of one foot on the ground at all times, the non-contact speed must be adequate to make the complete non-contact rotation before the other leg 410, 510 in that leg arrangement 20 reaches the angular position at the end of its ground contact phase where the extensible suspension member reaches the end of its travel.

When walking over uneven terrain, rotation of the swing arms 610 is preferable to reduce vertical force variations on the vehicle. The force transmitted to the vehicle through the swing arm actuators 670 is a function of the change in the torque applied from the swing arm actuator 670 to the chassis 12. If this torque can be maintained at a constant value, during rotation which results from moving over uneven terrain, force transfer to the chassis will be minimized. A rotary (swing arm) actuator 670 with low inertia and high speed response is preferable to maintain a constant torque during swing arm movements which are within a predetermined range. When a swing arm movement exceeds this range, the swing arm actuator 670 will preferable exert a gradually increasing torque to lift the chassis vertically (to maintain the desired ground clearance) at the lowest possible acceleration rate.

All of these actuator functions can be controlled by the processor 700. Certain functions like the individual leg pair rotation timing, could also be controlled by independent electronics, but for the purposes of this document, all the electrical controlling components are collectively referred to as a processor, whether formed by one or more independent elements. With some level of active control of the main swing arm actuators 650, the processor 700 can have one program function that maintains a constant torque on the chassis 16 from each of the four (in this non-limiting example) swing arm actuators 650. An additional control function would use the feedback from several sensors 710 to apply the necessary additional (positive or negative) torque to these actuators 470, 570, 670 to achieve the desired ride height and vehicle roll pitch and yaw angles. These sensors could, for example, include angle sensors 780 mounted on the chassis to determine vehicle attitude, and height sensors that can be used to ensure the vehicle clears obstacles.

Swing arm actuators 670 could also be of many different types including conventional suspension springs and dampers with conventional suspension linkage pivots. A combination of spring force/torque and rotary actuator force/torque can be used to reduce the requirement in the actuators.

Yaw direction changes in this exemplary embodiment can be accomplished by increasing the speed of the legs 410, 510 on one side of the vehicle relative to the legs on the other side of the vehicle, similar to a tank tread vehicle. A unique feature of the vehicle suspension linkage is the lateral compliance of the leg members (through compliance in the linkage and/or laterally flexible leg members). This lateral flexibility allows skid steering with reduced lateral sliding of the feet 460, 560 on the ground or whatever surface (not shown) the vehicle 10 is traversing.

Other optional features of this exemplary embodiment include an elevator/azimuth payload platform, and fold-out solar panels. The swing arms 610 may be on independent axles or rotary joints and independently actuated with independent suspensions. The leg arrangements 14 may rotate about independent rotary joints.

Actuators 470, 570, 670 for the leg arrangements 20 and swing arms 610 are shown in FIG. 5. The actuators 470, 570, 670 may comprise any suitable motors, for example hydraulic or electric, forming part of the rotary joints where the swing arms and leg assemblies are attached to the mobile platform. Motor controllers or valving for the actuators 470, 570, 670 may receive instructions along convention communication paths, including wireless or wired, from the processor 700 that may form part of the physical structure of the vehicle 10 or be located remotely (not shown).

Another important feature/function is the ability to transition from low speed mode, where the leg on the ground is rotating slower than the leg that is not contacting the ground, to a high speed mode where both legs are rotating at the same speed. With at least three sets, but four sets in a preferred embodiment, of this configuration, there will always be enough ground contact of at least two feet to provide adequate stability during high speed travel.

Referring to a set of two legs on a swing-arm, when in low speed mode, the non-contacting leg will be attempting to get back to contact before the other leg leaves the ground. In low speed mode, there is enough time to ensure that the other leg always rotates around in time to contact the ground before the other leg leaves the ground. Low speed mode allows a minimum of four contact points between the vehicle and the ground at all times. In low speed mode the phase of two legs on an arm (e.g. the front left arm) does not need to be timed in terms of phase shift relative to any other legs on other corners of the vehicle. This is illustrated in FIGS. 7-12.

Figure 7:
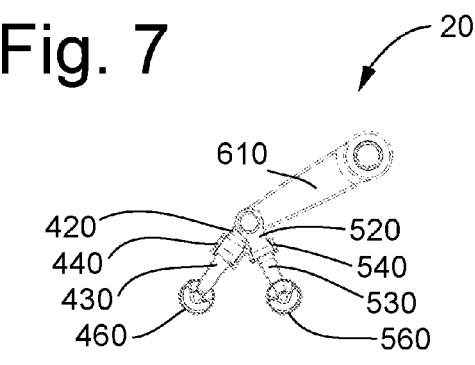
FIGS. 7-12 are lateral (rotational axis) views of an exemplary arm and leg assembly, each figure illustrating the leg arrangement in sequential rotational positions.
Figure 8:
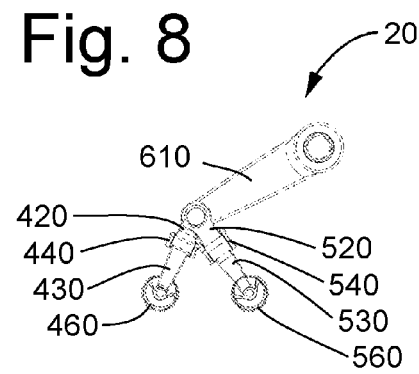
Figure 9:
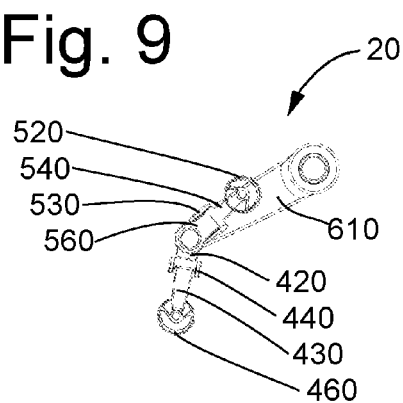
Figure 10:
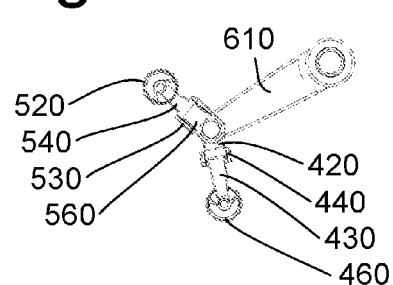
Figure 11:
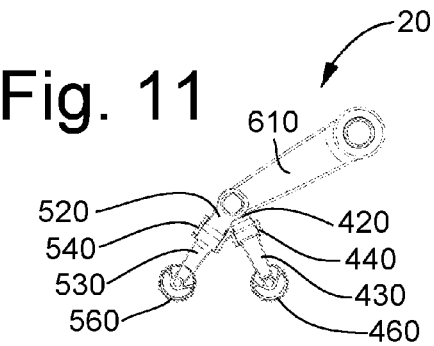
Figure 12:
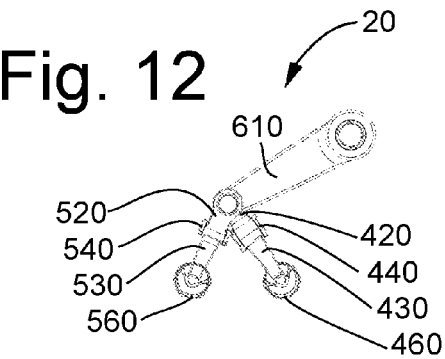

FIGS. 7-12 are lateral views of an exemplary arm and leg assembly 18, each figure illustrating the leg arrangement 20 in sequential rotational positions of low speed mode, with the legs rotating in a counter-clockwise direction.

a. FIG. 7 illustrates the assembly 18 at the instant the inner leg 410 first makes contact with the ground (not shown), with the outer leg 510 and inner leg being 60° apart and both legs touching the ground.

b. FIG. 8 illustrates the assembly 18 at the instant the outer leg 510 last makes contact with the ground (not shown), with the outer leg and inner leg 410 being 60° apart and both legs touching the ground.

c. FIG. 9 illustrates the assembly 18 at an instant when the inner leg 410 continues to rotate making contact with the ground, while the outer leg 510 rotates through the air, with the legs 140° apart as the outer leg has rotated 80° more rapidly than the inner leg.

d. FIG. 10 illustrates the assembly 18 at an instant when the inner leg 410 continues to rotate making contact with the ground, while the outer leg 510 rotates through the air, with the legs 140° apart as the outer leg has rotated 80° more rapidly than the inner leg.

e. FIG. 11 illustrates the assembly 18 at the instant the outer leg 510 first makes contact with the ground (not shown), with the inner leg 410 and outer leg being 60° apart and both legs touching the ground; the position of the legs mirrors the position of the legs in FIG. 7, with the inner and outer legs having switched positions.

f. FIG. 12 illustrates the assembly 18 at the instant the inner leg 410 last makes contact with the ground (not shown), with the inner leg and outer leg 510 being 60° apart and both legs touching the ground; the position of the legs mirrors the position of the legs in FIG. 8, with the inner and outer legs having switched positions.

g. Between FIG. 7 and FIG. 12, the inner leg 410 has rotated 70° while in contact with the ground, while the outer leg 510 has rotated 310° (20° while in contact with the ground and 290° through the air).

When in high speed mode, both legs 410, 510 will be generally 180° out of phase and rotating at constant speed. In high speed mode, the left front leg arrangement should rotate in phase with the right back legs; the diagonally opposite legs are preferably in phase so that a foot is in contact with the ground at approximately the same time as the diagonally opposed foot is also in contact with the ground, while all the feet that are parallel and perpendicular to the feet in contact with the ground will be moving through the air. Causing two diagonally opposed legs to contact the ground at the same time supports the vehicle on either side of its center of gravity. Having the legs on the opposite side of the vehicle at 90° out of phase ensures that two legs are contacting the ground at all times, even in high speed mode and that the two legs that are in contact with the ground always have the vehicle's 10 center of gravity between them. This is illustrated in FIGS. 13-15.

Figure 13:
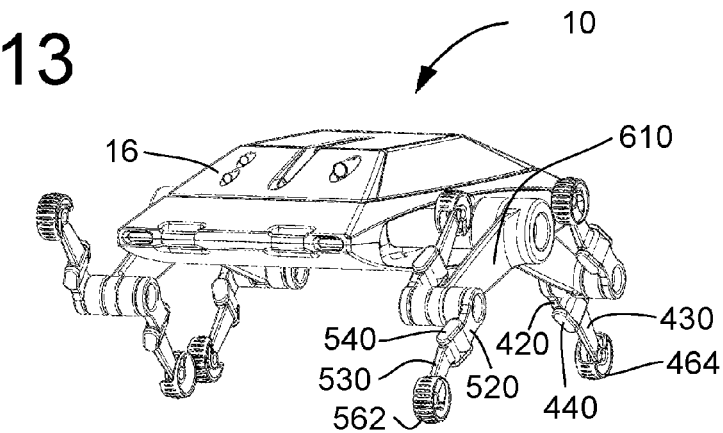
FIGS. 13-15 are isometric projections illustrating the exemplary robotic vehicle, each figure illustrating leg arrangements in sequential rotational positions.
Figure 14:
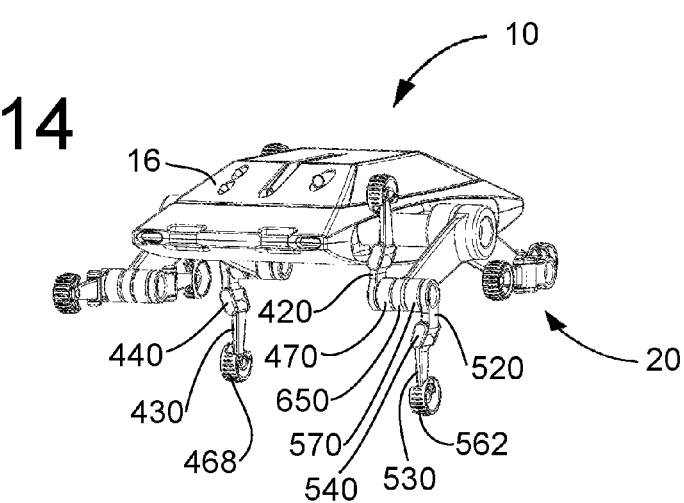
Figure 15:
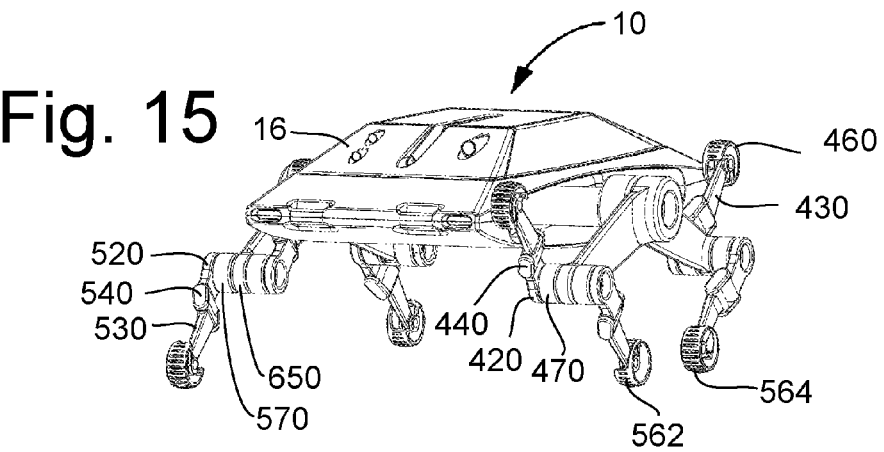

FIGS. 13-15 are isometric projections illustrating the exemplary robotic vehicle 10, each figure illustrating leg arrangements 20 in sequential rotational positions of high-speed mode, with the legs rotating forward in a counter-clockwise direction and each leg of a leg arrangement always approximately 180° apart.

a. FIG. 13 illustrates the vehicle 10 at the instant a front left outer foot 562 first makes contact with the ground (not shown), with a back left inner foot 464 last makes contact with the ground.

b. FIG. 14 illustrates the vehicle 10 at a moment the front left outer foot 562 and a back right outer foot 468 are each half way though the portion of their rotation where they are in contact with the ground (not shown), while the other leg arrangements 20 are perpendicular and moving through the air.

c. FIG. 15 illustrates the vehicle 10 at the instant the front left outer foot 562 last makes contact with the ground (not shown), with a back left outer foot 564 last makes contact with the ground.

Any kind of extensible leg will work (or even a non-extensible or flexible leg, but that a pivot arrangement like, but not limited to a four bar linkage or the pulley system shown in the figures is preferred for reliability and low friction). Shown here is an internal four bar linkage with cables for the links. No detail is shown about the internals of the leg extension pivot or torsion spring as these can be of many types that are known to someone skilled in the art of suspension design.

Legs are only optionally attached to arms 610 and can be rotationally mounted directly to the vehicle. The arms 610 that pivot at the center of the vehicle help with mobility and ground clearance and stability. The legs 410, 510 may be all rotationally fixed to the chassis 12 by a cantilevered shaft at the four corners of the vehicle 10 or to spars with the front legs may be attached to an anterior spar and the back legs attached to a posterior spar. More than two legs can be attached to each corner, or to any one swing arm, and the legs on opposed sides of the mobile platform need not be coaxial.

Embodiments of the disclosed mobile platform may be configured in many different ways. FIGS. 20-23 are leg rotation graphs for a non-limiting exemplary embodiment, in which there are four sets of two legs located at the four corners of the vehicle body. Each pair of legs is rotationally fixed to the end of a swing arm, although as indicated, the legs need not be coaxial and may be fixed to the corners of the mobile platform or other locations on the mobile platform. There are four swing arms with one pair of rotating legs on each. The legs in each set preferably rotate an average of approximately 180 degrees out of phase from each other from cycle to cycle. However, they are not always 180 degrees apart through a rotation because each leg travels faster through the non-contacting phase and slower through the ground contact phase. The Front Left and Rear Right sets are preferably in phase with each other. The Front Right and Rear Left sets are preferably in phase with each other. The Front Left/Rear Right are preferably 90 degrees out of phase to the Front Right/Rear Left so that the two legs in contact with the ground are always supporting the rover approximately through its center of gravity. Because a set of legs is mounted on a common axis at the end of each swing arm, one leg must be an "inner" and the other an "outer" leg. In the sets of legs that are in phase with each other, it is preferable, but not necessary in many applications, that the inner legs be in phase with each other (and therefore the outer legs in phase with each other) for more stable operation.

In the graphs, there are four sets of legs:
Set "1" is the Front Left set.
Set "2" is the Front Right set.
Set "3" is the Rear Right set.
Set "4" is the Rear Left set.
Each set has 2 legs labelled "A" and "B."

FIG. 20 shows a low speed mode. One leg of each set is in contact with the ground at all times. In the graph, there are transition points as follows:

1—Leg makes contact with the ground.
2—Leg travels at low speed through ground contact phase (in order to maintain constant velocity for the vehicle, the angular velocity of the leg must increase to the vertical orientation and then decrease again).
3—Leg loses contact with the ground.
4—Leg accelerates to a maximum rotational velocity.
5—Leg maintains constant angular velocity.
6—Leg decelerates in order to match the ground speed just before contact with the total speed of phase 3, 4, 5 and 6 being sufficient for this leg to regain ground contact before the other leg in this set loses ground contact. In this way, at least one leg is in contact with the ground at each corner of the vehicle at all times when in low speed mode.

Between low speed and high speed mode, there may be a transition speed mode, shown in FIG. 21. Every cycle has a slight delay between the first leg losing contact with the ground and the second leg contacting the ground. Velocity during ground contact phase 2, above, has increased while duration of ground contact has decreased). Cycle frequency has increased (cycle period "T" has decreased). In the transitional mode, it is preferred that diagonal leg sets are rotating generally in phase so two diagonal legs are generally in contact with the ground at the same time. The legs may all travel at variable and different speeds at a moment in time when in low speed or transitional mode.

FIG. 22 shows a high speed mode of operation. In high speed mode of operation, the angular velocity of a leg through ground contact phase matches the angular velocity through the non-contacting phase (constant angular velocity through entire rotation, hence straight lines). The ground contact in high speed mode may have the same contact phase shift as with low and transition speeds, as only one example of how the phasing can be done. The A and B can also be switched on one or more arms.

FIG. 23 shows a turning mode of operation. Referring to FIG. 23, there is shown: "V1g": the maximum angular velocity as a front left leg moves through the ground contact phase; "V1n": the maximum angular velocity as a front left leg moves through the non-contacting phase; "V2g": the maximum angular velocity as the front right leg moves through the ground contact phase; and "V2n": the maximum angular velocity as the front right leg moves through the non-contacting phase. Differential speed between leg sets and right leg sets causes the mobile platform to turn.

In FIG. 23, sets "1" and "4" are the sets on the inside of the turn and sets "2" and "3" are on the outside of the turn. "V2g" is greater than "V1g" showing the speed differential required in the ground contact phase in order to cause the rover to turn to the left. In order for all the leg sets to maintain their phase differential, their periods of rotation need to be equal. As a result, "V1n" is greater than "V2n" in order to compensate for the slower "V1g" during the ground contact phase.

Because the support members for the legs in this exemplary embodiment do not turn about a vertical axis, the preferred path during the ground contact phase is a straight line. Turning is caused by applying differential speeds to the left and right leg sets. This would typically cause local lateral skidding under each ground contacting member during a turn. Because, the legs can passively tilt inward (relative to the rover centerline) or outward the amount of skidding can be minimized.

The various leg rotation modes can be implemented by algorithms stored as a series of instructions or software in memory executable by the processor 710; the processor may be configured by changes to the software or hardware.

An example of a leg arrangement, with one leg shown, is shown in FIGS. 24-27, in which the leg has linear extension/compression and with lateral flexibility. Linear compression of a leg 20 may be achieved though many different linkage and/or sliding means such as but not limited to telescoping shocks or four bar linkage systems. A telescoping member such as a single stanchion from a bicycle front suspension is an example of a suitable suspension that can be tuned in terms of spring rate and damping.

Figure 29:
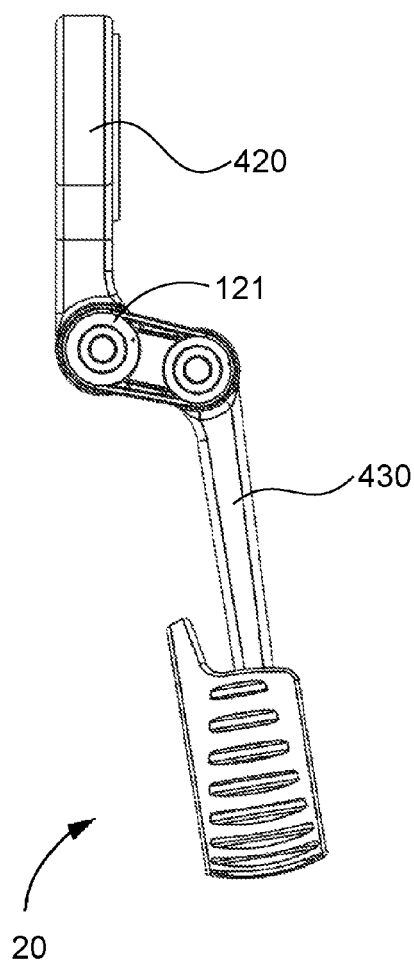
FIGS. 29-30 show side-to-side flexibility of the lower leg as a result of the upper pulley rotating relative to the upper leg.
Figure 30:
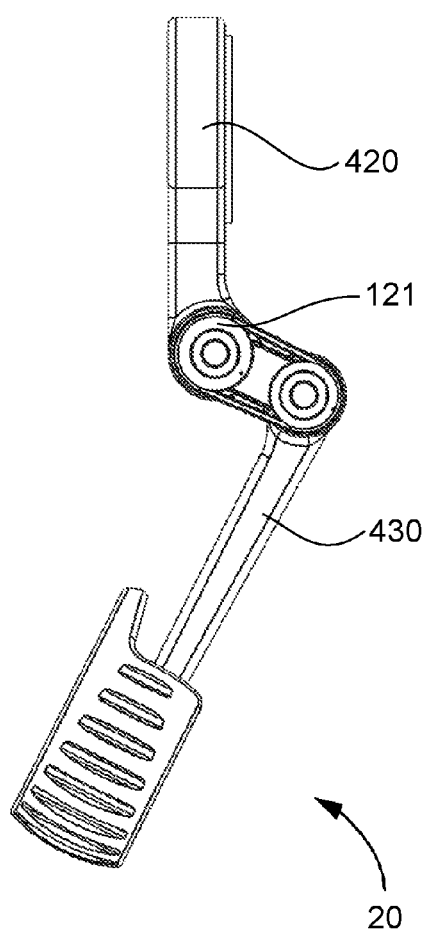

Shown in FIGS. 29-30 is linkage system that possesses light weight and low friction when forces are applied at an angle to the leg extension/compression direction such as just after initial ground contact. Pivoting linkages may be constructed with rotary bearings which can tolerate high side loads without substantial increases in friction or wear. A compact linkage is shown here which allows generally linear compression, as well as lateral flexibility to allow differential speed steering with reduced sliding. These figures illustrate the flexibility of the lower leg 430 as a result of the upper pulley 121 rotating relative to the upper leg 420. The upper pulley 121 rotation may be controlled or restrained by means including, but not limited to, a torsion spring.

As shown in FIGS. 24-27, a pulley 121 may be fixed or rotationally secured to the upper leg member 420, and a corresponding pulley 125 fixed or rotationally secured to the lower leg member 430. The rotation of the upper pulley 121 and/or lower pulley 125 is preferably constrained by a rotation spring means such as, but not limited to a torsion spring which biases the pulley/s to a position relative to the leg member it is attached to. A rotating link 124 is fixed to two shafts 123 that are rotationally fixed to each of the upper and lower leg members 420, 430. The rotating link 124 and shafts 123 maintain the pivot axis of the two leg members 420, 430 at a fixed distance. One or both shafts 123 of the rotation link 124 is preferably constrained from rotation in both directions with a spring, such as, but not limited to a torsion spring that is attached to an arm. This provides the load bearing capability of the present device leg as well as a passive (or possibly active or semi active) suspension system to allow rotation of the leg actuator through the ground contact phase with minimal force variation on the vehicle 10. FIGS. 25 and 26 show a leg arrangement 20 with different extension positions.

The upper and lower pulley 121, 125 are linked together with a link means 126 such as cable and/or chain and/or toothed belt and/or strap and/or gears such that a generally linear extension/compression of the ground contact patch along the lengthwise axis of the leg is accomplished through the ground contact phase. The use of a smaller diameter pulley 125 on the lower leg 430 reduces the lateral movement of the foot 460 during compression. The use of a variable radius pulley 121, 125 on the top and/or bottom pulley may provide beneficial effects with regard to foot travel path.

The spring-constrained rotation of one or both of the upper and lower pulleys 121, 125 provides a level of lateral compliance in the lower leg 430 and contact patch with the ground. This lateral compliance serves the purpose of allowing differential speed steering (from left to right side actuators) to accomplish direction changes of the vehicle 10 with reduced skidding of the feet 460 on the ground.

With a typical skid steer system, there is a level of skidding that is proportional to the turning angle. With this lateral flexibility of the mobile platform, all or a portion of the skidding can be eliminated up to a certain turning rate at a given speed by allowing the legs to articulate sideways. This is preferably a passive suspension characteristic but it can be actively or semi-actively controlled. Many other means of providing lateral compliance are conceivable. Some form of viscous or active damping may be used in the rotation linkage and/or lateral compliant systems.

An amphibious mode of operation is shown in FIG. 28 in which the swing arms 610 may be raised above the bottom of the payload shell 16 to allow the legs to propel the vehicle 10 in paddle wheel mode.

The mobile platform may operate in a variety of modes, instructed by the processor or equivalent controller. For example, the mode may be set so that when the mobile platform is traveling in a straight line, legs on one corner of the vehicle rotate to achieve the same average ground speed and rotate in phase with legs at a diagonal across the vehicle center of gravity. This allows for different length legs.

For example, the mode may be set so that when the mobile platform is traveling in a straight line, legs on a front corner of the vehicle may rotate to achieve the same average ground speed as legs on the opposite side of the vehicle at the front of the vehicle, with legs on the opposite side out of phase with legs on the first side by an average of 360 degrees divided by twice the number of legs on a corner. For further example, the mode may be set so that when the mobile platform is traveling in a straight line, legs on a corner may rotate at higher ground contact speed to change vehicle direction than legs on the opposite side of the vehicle, while staying, on average, in phase with legs at a diagonal corner. For example, this is 90 degrees out of phase for a two-leg corner, and 60 degrees out of phase for a three leg corner etc. For further example, the mode may be set so that when the mobile platform is traveling in a straight line, legs on a front corner may rotate at higher ground contact speed to change vehicle direction than legs at the front and on the opposite side of the vehicle, while staying, on average, out of phase by an average of 360 degrees divided by twice the number of legs on a corner. For further example, the mode may be set so that when the mobile platform is traveling in a straight line, two or more legs on a corner rotate at the same speed in high speed mode.

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

What is claimed is:

1. A mobile platform, comprising:
a main body having a first side and a second side which together define a lateral direction with respect to the main body;
a first leg mounted for 360 degree rotation in a first plane on the main body at a first rotary joint on the first side of the mobile platform, the first leg connected to be driven by a first actuator controlled by a processor and the first rotary joint having a first rotation axis;
a second leg mounted for 360 degree rotation in a second plane on the main body at a second rotary joint on the main body, the second leg connected to be driven by a second actuator controlled by the processor and the second rotary joint having a second rotation axis;
the processor being configured to instruct the first actuator to rotate the first leg at higher speed when the first leg is not in contact with a ground surface than when the first leg is in contact with the ground surface;
the processor being configured to instruct the second actuator to rotate the second leg at higher speed when the second leg is not in contact with the ground surface than when the second leg is in contact with the ground surface;
a third leg mounted for 360 degree rotation in a third plane on the main body at a third rotary joint on the second side of the mobile platform, the third leg connected to be driven by a third actuator controlled by the processor and the third rotary joint having a third rotation axis;
a fourth leg mounted for 360 degree rotation in a fourth plane on the main body at a fourth rotary joint on the second side of the mobile platform, the fourth leg connected to be driven by a fourth actuator controlled by the processor and the fourth rotary joint having a fourth rotation axis;
the processor being configured to instruct the third actuator to rotate the third leg at higher speed for more than 180 degrees of rotation when the third leg is generally expected to not be in contact with the ground surface and when the third leg is generally expected to be in contact with the ground surface; and
the processor being configured to instruct the fourth actuator to rotate the fourth leg at higher speed when the fourth leg is expected to be generally not in contact with the ground surface and when the fourth leg is expected to be generally in contact with the ground surface;
in which the sensor arrangement is arranged to determine when the third leg is in contact with a ground surface and when the fourth leg is in contact with the ground surface; and
in which the third leg and the fourth leg are mounted co-axially.

2. A mobile platform, comprising:
a main body having a first side and a second side which together define a lateral direction with respect to the main body;
a first leg mounted for 360 degree rotation in a first plane on the main body at a first rotary joint on the first side of the mobile platform, the first leg connected to be driven by a first actuator controlled by a processor and the first rotary joint having a first rotation axis;
a second leg mounted for 360 degree rotation in a second plane on the main body at a second rotary joint on the main body, the second leg connected to be driven by a second actuator controlled by the processor and the second rotary joint having a second rotation axis;
the processor being configured to instruct the first actuator to rotate the first leg at higher speed when the first leg is not in contact with a ground surface than when the first leg is in contact with the ground surface; and
the processor being configured to instruct the second actuator to rotate the second leg at higher speed when the second leg is not in contact with the ground surface than when the second leg is in contact with the ground surface;
in which the second rotary joint is located on the first side of the main body, axially displaced from the first actuator.

3. The mobile platform of claim 2 further comprising a sensor arrangement for determining when the first leg is in contact with the ground surface and when the second leg is in contact with the ground surface and the processor is responsive to the sensor arrangement to control the first actuator and the second actuator.

4. The mobile platform of claim 2 in which the processor is configured to instruct the first actuator and the second actuator to follow stored leg rotation algorithms.

5. A mobile platform, comprising:
a main body having a first side and a second side which together define a lateral direction with respect to the main body;
a first leg mounted for 360 degree rotation in a first plane on the main body at a first rotary joint on the first side of the mobile platform, the first leg connected to be driven by a first actuator controlled by a processor and the first rotary joint having a first rotation axis;
a second leg mounted for 360 degree rotation in a second plane on the main body at a second rotary joint on the main body, the second leg connected to be driven by a second actuator controlled by the processor and the second rotary joint having a second rotation axis;
the processor being configured to instruct the first actuator to rotate the first leg at higher speed when the first leg is not in contact with a ground surface than when the first leg is in contact with the ground surface; and
the processor being configured to instruct the second actuator to rotate the second leg at higher speed when the second leg is not in contact with the ground surface than when the second leg is in contact with the ground surface;

in which each of the first leg and the second leg are variable in length and exert an increased extension force as the respective first leg and the second leg are compressed allowing a terminal point on each of the first leg and the second leg to travel in a generally circular path for greater than 180 degrees, and a generally straight and horizontal path for less than 180 degrees as a result of ground contact forces shortening the leg length progressively toward a vertical leg angle.

6. The mobile platform of claim 5 in which the first leg is more flexible in the lateral direction than in the first plane and the second leg is more flexible in the lateral direction than in the second plane.

7. The mobile platform of claim 5 in which the processor is configured to rotate the first leg and the second leg so that at least one of the first leg and the other leg is in contact with the ground at all times.

8. The mobile platform of claim 5 in which the processor is configured to rotate the first leg and the second leg so that the rotational speed of each of the first leg and the second leg is lower at an initial and a final ground contact positions and higher at a vertical leg position to maintain a generally constant horizontal speed of the respective first rotary joint and second rotary joint.

9. A mobile platform, comprising:
a main body having a first side and a second side which together define a lateral direction with respect to the main body;
a first leg mounted for 360 degree rotation in a first plane on the main body at a first rotary joint on the first side of the mobile platform, the first leg connected to be driven by a first actuator controlled by a processor and the first rotary joint having a first rotation axis;
a second leg mounted for 360 degree rotation in a second plane on the main body at a second rotary joint on the main body, the second leg connected to be driven by a second actuator controlled by the processor and the second rotary joint having a second rotation axis;
the processor being configured to instruct the first actuator to rotate the first leg at higher speed when the first leg is not in contact with a ground surface than when the first leg is in contact with the ground surface; and
the processor being configured to instruct the second actuator to rotate the second leg at higher speed when the second leg is not in contact with the ground surface than when the second leg is in contact with the ground surface;
in which, in each of the first leg and the second leg, two or more feet are rotational attached to a generally vertically movable suspension member.

10. A mobile platform, comprising:
a main body having a first side and a second side which together define a lateral direction with respect to the main body;
a first leg mounted for 360 degree rotation in a first plane on the main body at a first rotary joint on the first side of the mobile platform, the first leg connected to be driven by a first actuator controlled by a processor and the first rotary joint having a first rotation axis;
a second leg mounted for 360 degree rotation in a second plane on the main body at a second rotary joint on the main body, the second leg connected to be driven by a second actuator controlled by the processor and the second rotary joint having a second rotation axis;
the processor being configured to instruct the first actuator to rotate the first leg at higher speed when the first leg is not in contact with a ground surface than when the first leg is in contact with the ground surface; and
the processor being configured to instruct the second actuator to rotate the second leg at higher speed when the second leg is not in contact with the ground surface than when the second leg is in contact with the ground surface;
in which the first leg and the second leg are mounted co-axially.

11. A mobile platform having a main body with a first side and a second side which together define a lateral direction with respect to the main body, and at least one leg arrangement, said at least one leg arrangement comprising
a first leg mounted for 360 degree rotation in a first plane on the main body at a first rotary joint on the first side of the mobile platform, the first leg connected to be driven by a first actuator controlled by a processor and the first rotary joint having a first rotation axis;
a second leg mounted for 360 degree rotation in a second plane on the main body at the first rotary joint, the second leg connected to be driven by a second actuator controlled by the processor; and
the processor being configured to Instruct the first actuator to rotate the first leg and the second actuator to rotate the second leg.

12. The mobile platform of claim 11 further comprising a swing arm mounted on the main body, the at least one leg arrangement being mounted on the swing arm.

13. The mobile platform of claim 12 wherein the swing arm is mounted on the main body via a spar extending from the main body.

14. The mobile platform of claim 11 wherein the at least one leg arrangement comprises a plurality of leg arrangements, each leg arrangement of the plurality of leg arrangements being mounted on a respective swing arm mounted on the main body.

15. The mobile platform of claim 14 wherein the at least one leg arrangement comprises at least four leg arrangements, each leg arrangement of the at least four leg arrangements being mounted on a swing arm, and the swing arms are mounted in pairs on opposed sides of the main body.

16. The mobile platform of claim 11 wherein each of the first leg and the second leg is variable in length and exerts an increased extension force as the respective first leg and the second leg is compressed allowing a terminal point on each of the first leg and the second leg to travel in a generally circular path for greater than 180 degrees, and a generally straight and horizontal path for less than 180 degrees as a result of ground contact forces shortening the leg length progressively toward a vertical leg angle.

17. The mobile platform of claim 11 wherein the first leg is more flexible in the lateral direction than in the first plane and the second leg is more flexible in the lateral direction than in the second plane.

18. The mobile platform of claim 17 wherein a lateral flexibility of the first leg and the second leg is provided by flexible members or spring joints.

19. The mobile platform of claim 11 wherein the processor is configured to cause, when the mobile platform is travelling in a straight line, the first leg and the second leg to rotate at a same average ground speed.

20. The mobile platform of claim 11 wherein the at least one leg arrangement comprises a plurality of leg arrangements, each said leg arrangement includes a respective first leg and second leg, said respective first and second legs are placed on a diagonal across a center of gravity of the mobile platform, and the legs across the diagonal rotate in phase.

21. The mobile platform of claim 11 least one leg arrangement comprises a plurality of leg arrangements, the processor is configured to instruct the respective first and second legs of the plurality of leg arrangements so that when the mobile platform is traveling in a straight line, the respective first and second legs on a front corner of the mobile platform rotate to achieve a same average ground speed as the respective first and second legs on an opposite side of the mobile platform, said legs on the opposite side out of phase with legs on the first side by an average of 360 degrees divided by twice a number of legs on a corner.

22. The mobile platform of claim 11 wherein the at least one leg arrangement comprises a plurality of leg arrangements, the processor Is configured to instruct the respective first and second legs of the plurality of leg arrangements so that the respective first and second legs on a corner rotate at a higher ground contact speed to change a mobile platform direction than the respective first and second legs on an opposite side of the mobile platform, while staying, on average, in phase with the respective m at a diagonal corner.

23. The mobile platform of claim 11 wherein the least one leg arrangement comprises a plurality of leg arrangements, the processor is configured to instruct the respective first and second legs of the plurality of leg arrangements so that the respective first and second legs on a front corner rotate at a higher ground contact speed to change a mobile platform direction than the respective first and second legs on an opposite side of the mobile platform, while staying, on average, out of phase by an average of 360 degrees divided by twice a number of legs on a corner.

24. The mobile platform of claim 11 wherein the processor is configured to instruct the legs on a corner of the mobile platform to rotate at a same speed in a high speed mode.

* * * * *

UNITED STATES PATENT AND TRADEMARK OFFICE
CERTIFICATE OF CORRECTION

Page 1 of 1

PATENT NO. : 9,957,002 B2
APPLICATION NO. : 15/012664
DATED : May 1, 2018
INVENTOR(S) : James Brent Klassen It is certified that error appears in the above-identified patent and that said Letters Patent is hereby corrected as shown below:

In the Claims

Column 19, Line 1 Claim 21:
"platform of claim 11 least one leg" should read, --platform of claim 11 wherein the at least one leg--.

Column 19, Line 14 Claim 22:
"processor Is configured" should read, --processor is configured--.

Column 20, Line 3 Claim 22:
"the respective m at a diagonal corner" should read, --the respective legs at a diagonal corner--.

Column 20, Line 4 Claim 23:
"wherein the least one" should read, --wherein the at least one--.

Signed and Sealed this
Twenty-first Day of January, 2020

Andrei Iancu
*Director of the United States Patent and Trademark Office*